United States Patent
Takahashi et al.

(10) Patent No.: US 9,283,682 B2
(45) Date of Patent: Mar. 15, 2016

(54) ROBOT SYSTEM HAVING WIRELESS ACCELERATION SENSOR

(71) Applicant: FANUC Corporation, Yamanashi (JP)

(72) Inventors: Shougo Takahashi, Yamanashi (JP); Takehisa Sera, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/583,073

(22) Filed: Dec. 24, 2014

(65) Prior Publication Data

US 2015/0183114 A1    Jul. 2, 2015

(30) Foreign Application Priority Data

Dec. 26, 2013   (JP) ................................. 2013-269774

(51) Int. Cl.
    *G05B 15/00*      (2006.01)
    *B25J 13/00*      (2006.01)
    *B25J 9/16*       (2006.01)
    *B25J 13/08*      (2006.01)

(52) U.S. Cl.
    CPC .............. *B25J 13/006* (2013.01); *B25J 9/1641* (2013.01); *B25J 9/1692* (2013.01); *B25J 9/1694* (2013.01); *B25J 13/088* (2013.01); *G05B 2219/33192* (2013.01); *G05B 2219/39195* (2013.01); *G05B 2219/40549* (2013.01); *Y10S 901/09* (2013.01)

(58) Field of Classification Search
    CPC ...... B25J 13/006; B25J 9/1641; B25J 9/1642; B25J 9/1694; B25J 13/008
    USPC ........................................................ 700/253
    See application file for complete search history.

(56) References Cited

U.S. PATENT DOCUMENTS

| | | | | |
|---|---|---|---|---|
| 4,616,326 A | * | 10/1986 | Meier ................... | B23K 9/1272 318/561 |
| 8,271,134 B2 | * | 9/2012 | Kato ......................... | B25J 9/163 700/253 |
| 2006/0082340 A1 | * | 4/2006 | Watanabe ................ | B25J 9/163 318/568.21 |
| 2007/0073502 A1 | * | 3/2007 | Umeda ................... | G01P 21/00 702/96 |
| 2012/0296471 A1 | * | 11/2012 | Inaba ....................... | B25J 9/163 700/253 |

FOREIGN PATENT DOCUMENTS

| | | |
|---|---|---|
| JP | 2007-58729 A | 3/2007 |
| JP | 2010-68403 A | 3/2010 |
| JP | 2011-90500 A | 5/2011 |
| JP | 2011-161562 A | 8/2011 |
| JP | 2011-167817 A | 9/2011 |
| JP | 2012-19345 A | 1/2012 |
| JP | 2013-3926 A | 1/2013 |
| JP | 2013-172228 A | 9/2013 |

* cited by examiner

*Primary Examiner* — Ian Jen
(74) *Attorney, Agent, or Firm* — Hauptman Ham, LLP

(57) ABSTRACT

A robot system capable of effectively transmitting acceleration data from a wireless acceleration sensor to a robot controller. The acceleration sensor has a time series number adding part which adds a number representing time series of the acceleration data of the robot, a data set generating part which generates a data set including acceleration data in a plurality of periods of time, and a first wireless communication part which transmits the data set to the robot controller by radio. The robot controller has an acceleration data judging part which checks the time series number added to the acceleration data contained in the data set received by a second wireless communication part and judges as to whether the time series is correctly received, and a vibration suppression controlling part which carries out vibration suppression control for the robot based on the time series of the acceleration data.

6 Claims, 7 Drawing Sheets

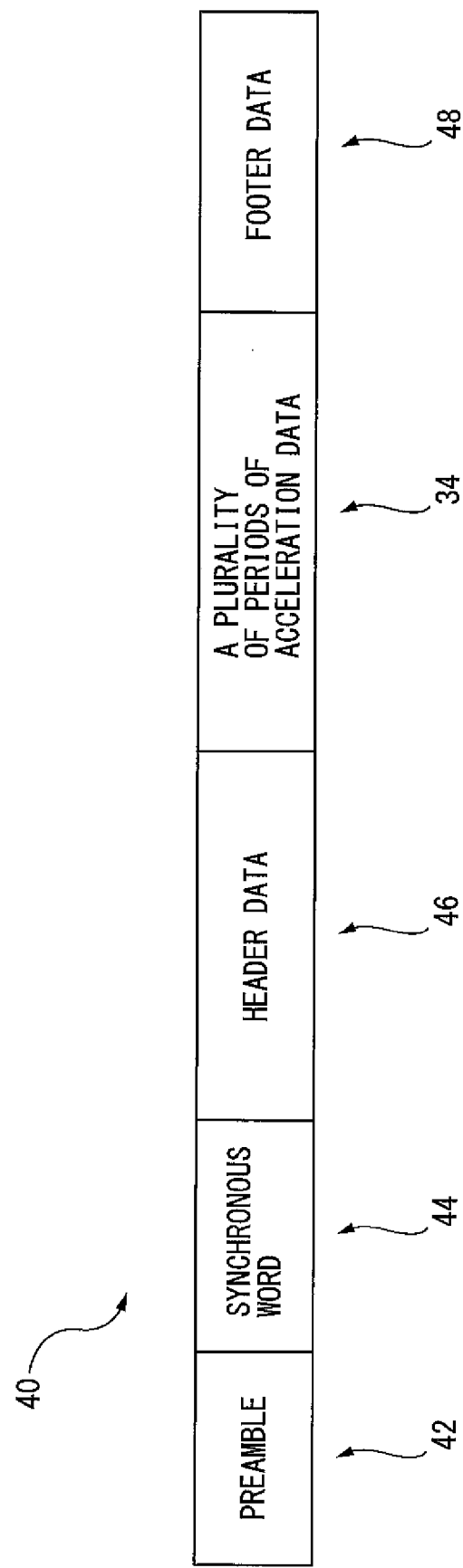

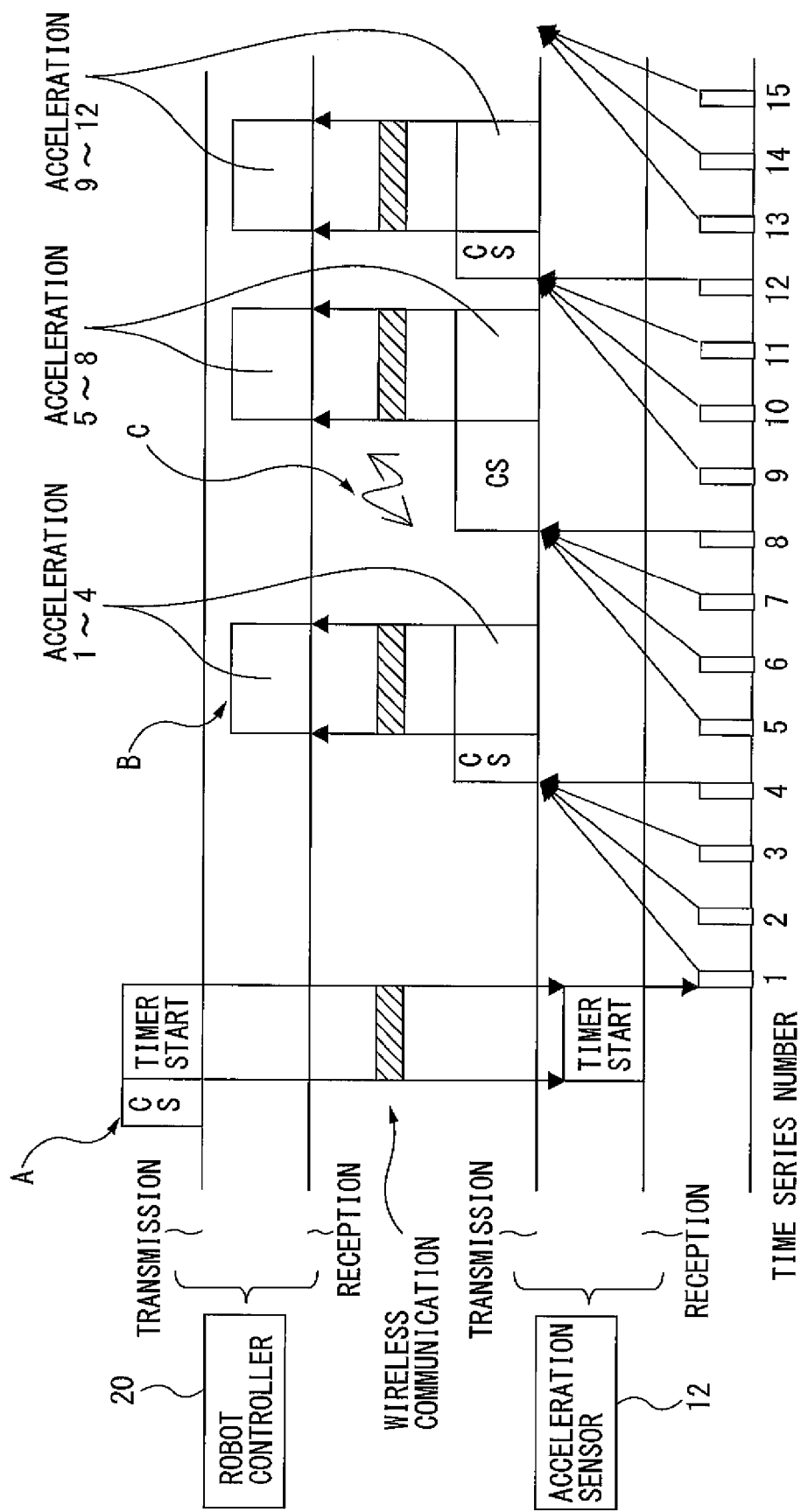

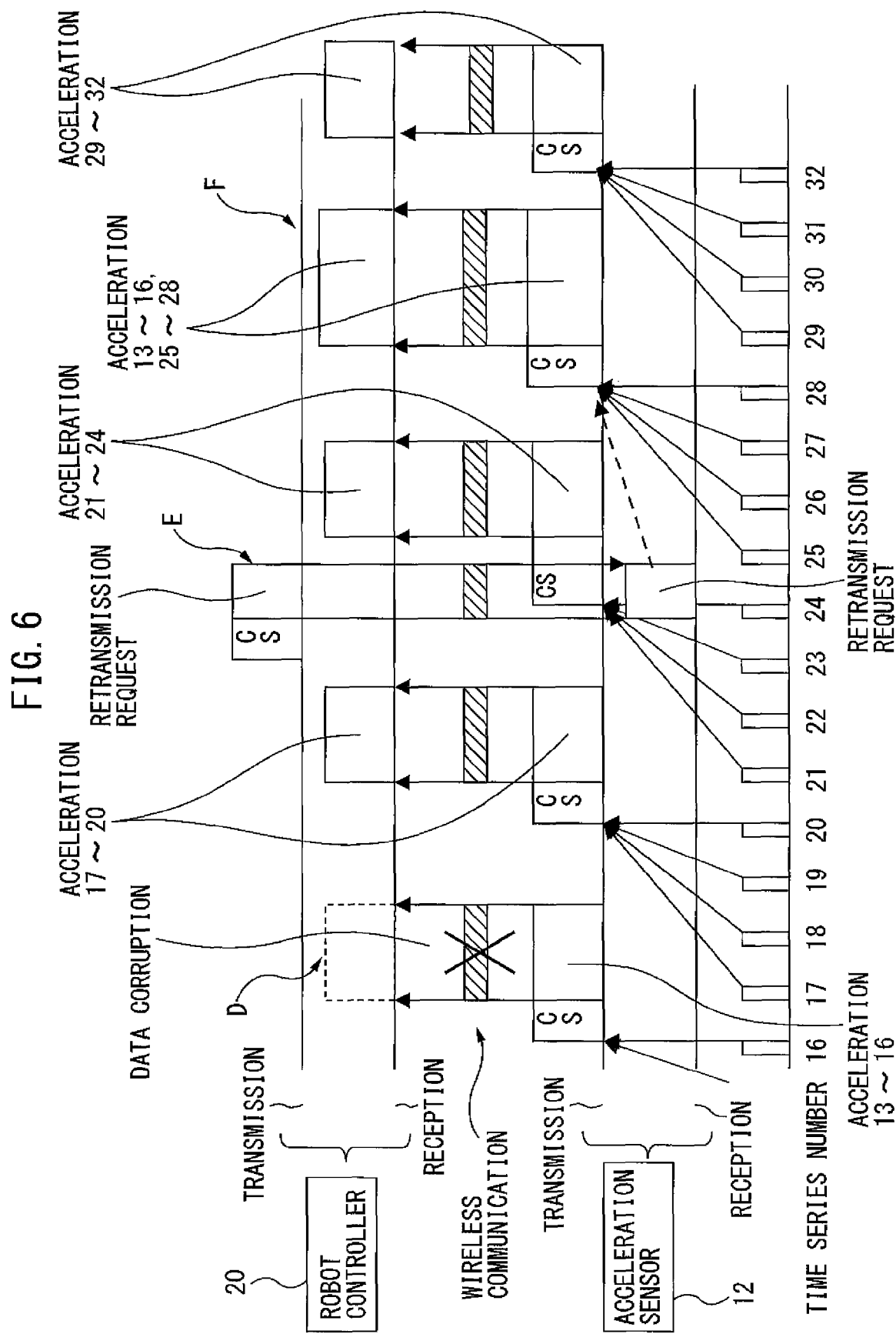

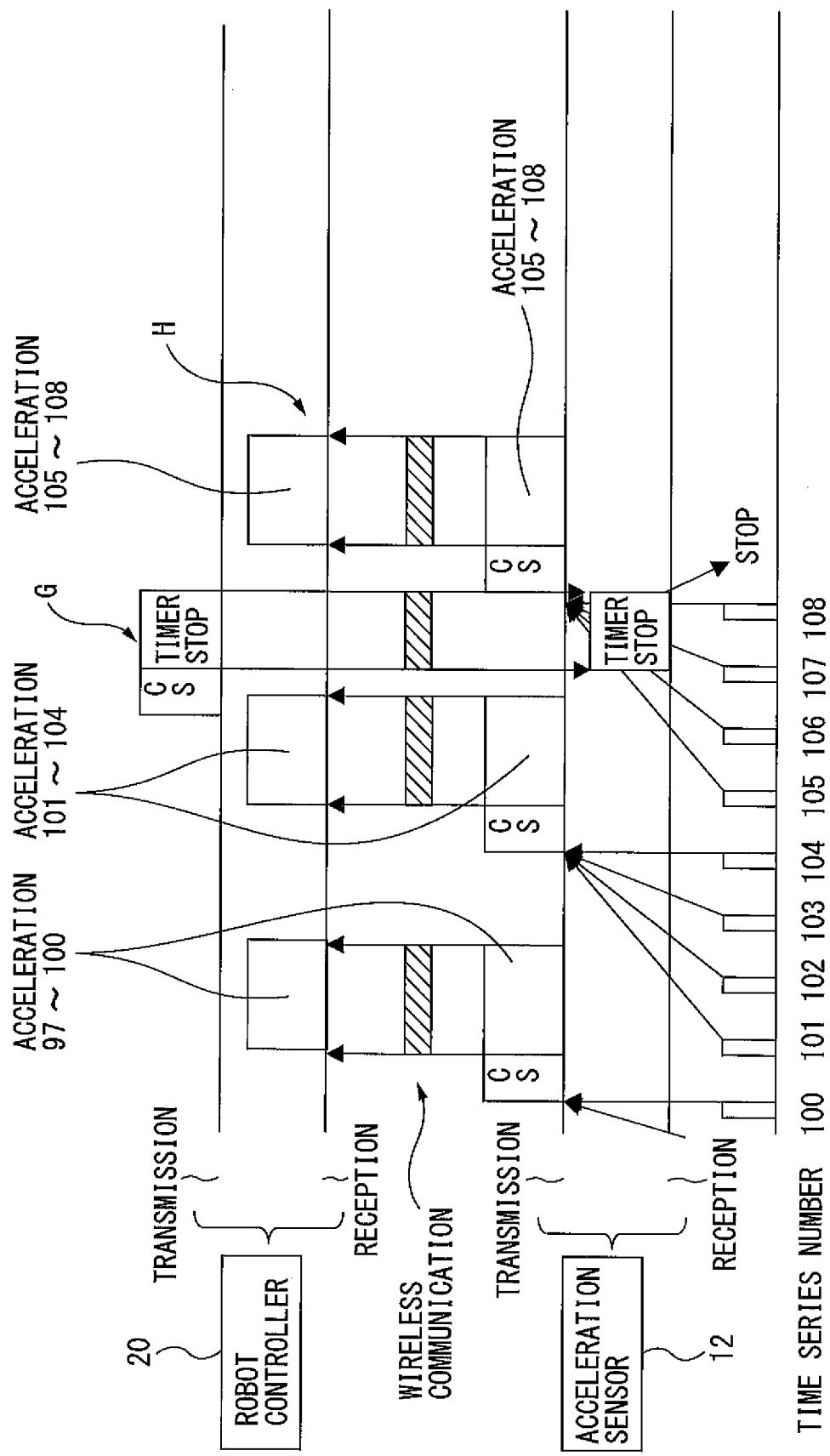

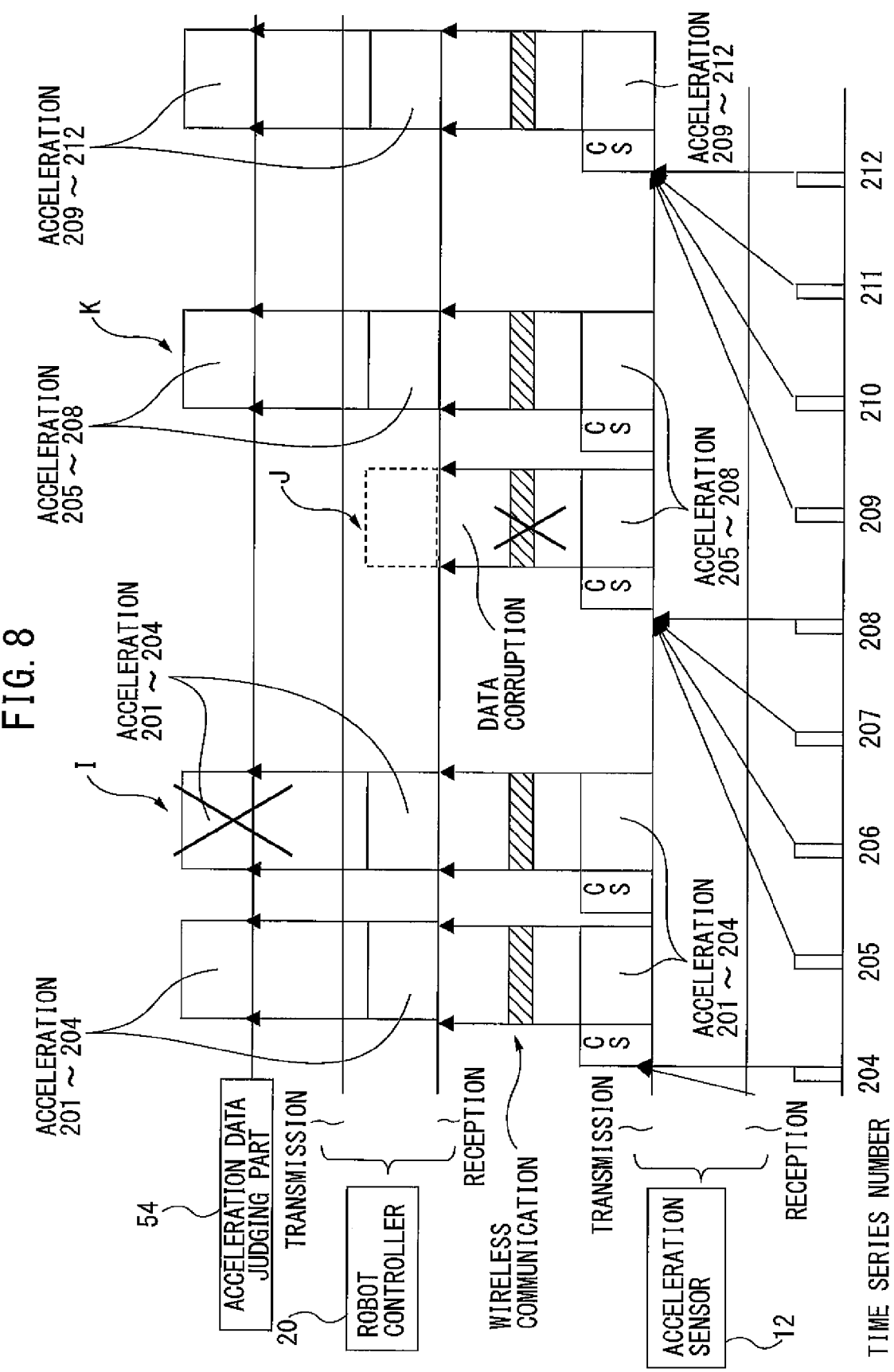

ROBOT SYSTEM HAVING WIRELESS ACCELERATION SENSOR

RELATED APPLICATIONS

The present application claims priority to Japanese Application Number 2013-269774, filed Dec. 26, 2013, the disclosure of which is hereby incorporated by reference herein in its entirety.

BACKGROUND OF THE INVENTION

1. Field of the Invention

The preset invention relates to a robot system having a robot with a wireless acceleration sensor.

2. Description of the Related Art

In a high-speed motion of a robot, a trajectory error and/or oscillating positional component may occur in a movable part of the robot such as a robot arm. In order to reduce the trajectory error and the magnitude of oscillating positional component, for example, JP 2011-167817 A discloses a technique of learning control by measuring a trajectory error and a vibration error of a robot by means of an acceleration sensor attached to a front end of a robot arm.

In many cases, the acceleration sensor is temporarily attached to the front end of the robot arm, and is removed after the learning control and during actual operation of the robot arm. Therefore, the acceleration sensor is desired to be easily attached to or detached from the robot, in particular, is desired to communicate with a robot controller by radio, in view of complicated arrangement of a wire.

On the other hand, JP 2011-090500 A discloses a wireless communication system having a host and a plurality of radio terminals, wherein measurement information obtained by periodically activating a sensor is stored and a stored plurality of sets of information are collectively transmitted to the host, in order to realize a power-saving wireless communication.

In order to carry out learning control for suppressing vibration in the robot, time-series acceleration data in execution of a robot operation program is necessary. However, if the acceleration data is transmitted from an acceleration sensor to a robot controller by wireless communication, when a part of the acceleration data is corrupted or is not received by the robot controller, the time-series data becomes improper, and therefore the learning control cannot be correctly carried out.

When data is transmitted by radio, it is necessary to satisfy a wireless communication standard in each country. For example, a time for one wireless outputting operation, a quiescent time after the wireless outputting operation, and a summation of transmission time per hour, etc., are limited or stipulated by law. Further, when the data is transmitted by radio, it is necessary to transmit header and footer data such as an address and a CRC (cyclic redundancy code), etc., as well as sensor data regarding information measured by a sensor. Therefore, the radio communication standard may not be satisfied, if cyclic data is transmitted to the robot controller by radio each time when the cyclic data is obtained.

The technique described in JP 2011-090500 A is mainly intended to improve electrical power saving effect. Therefore, JP 2011-090500 A does not disclose measures in case data, such as acceleration data of the robot cannot be obtained. Further, JP 2011-090500 A does not mention an approach for satisfying the stipulation in the wireless communication standard.

SUMMARY OF THE INVENTION

Therefore, an object of the present invention is to provide a robot system capable of effectively transmitting acceleration data from a wireless acceleration sensor to a robot controller.

According to the present invention, there is provided a robot system comprising: a robot having a movable part to which a wireless acceleration sensor is attached; and a robot controller for controlling the robot, wherein the wireless acceleration sensor comprises: a timer for carrying out periodic measurement; an acceleration measuring instrument which measures an acceleration of the movable part of the robot in each period of time measured by the timer; an identifying information adding part which adds identifying information to acceleration data measured by the acceleration measuring instrument, the identifying information representing time series of the acceleration data; a measurement information storing part which stores the acceleration data to which the identifying information is added; a data set generating part which generates a data set which includes acceleration data in a plurality of periods of time, among the acceleration data stored in the measurement information storing part; and a first wireless communication part which transmits the data set to the robot controller by radio, and wherein the robot controller comprises: a robot controlling part which operates the robot according to a predetermined operation program; a second wireless communication part which carries out wireless communication with the first communication part and receives the data set from the wireless acceleration sensor; an acceleration data judging part which confirms the identifying information added to the acceleration data contained in the data set, and judges as to whether the time series of the acceleration data is correctly received; and a vibration suppression controlling part which carries out vibration suppression control for the robot based on the time series of the acceleration data during the robot is operated based on the operation program.

In a preferred embodiment, the data set includes acceleration data in N-number of periods of time, wherein N is an integer equal to or more than two and is previously calculated so as to satisfy a limitation of a time for one wireless outputting operation, a limitation of a quiescent time, and a limitation of a summation of transmission time per hour, which are stipulated in a wireless communication standard applied to a usage environment of the robot system.

In a preferred embodiment, the robot controller confirms the identifying information added to acceleration data received from the acceleration sensor, and then, when there is a missing part in the identifying information, the robot controller transmits a retransmission request to the acceleration sensor so that the acceleration sensor retransmits acceleration data corresponding to the missing part, or calculates acceleration data corresponding to the missing part based on interpolation using acceleration data before and after the missing part.

In a preferred embodiment, the acceleration sensor transmits the same acceleration by radio several times, and then, when the identifying information added to acceleration data received from the acceleration sensor is identical to the identifying information added to previously received acceleration data, the robot controller discards acceleration data including the same identifying information except for one of the acceleration data including the same identifying information.

BRIEF DESCRIPTION OF THE DRAWINGS

The above and other objects, features and advantages of the present invention will be made more apparent by the following description of the preferred embodiments thereof, with reference to the accompanying drawings, wherein:

FIG. 4 shows an example of a format of packetized wireless data;

FIG. 5 shows an example of data transmission/reception by wireless communication in the robot system of the invention;

FIG. 6 shows an example of data transmission/reception by wireless communication in the robot system of the invention;

FIG. 7 shows an example of data transmission/reception by wireless communication in the robot system of the invention; and FIG. 8 shows an example of data transmission/reception by wireless communication in the robot system of the invention.

DETAILED DESCRIPTIONS

Figure 1:
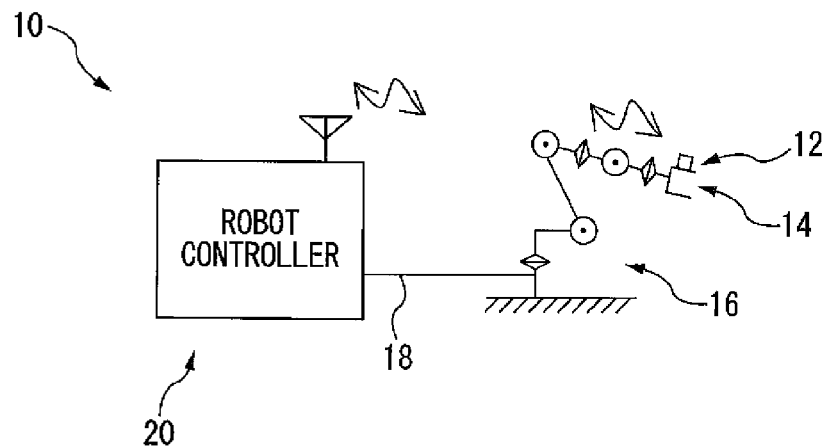
FIG. 1 shows a schematic configuration of a robot system according to a preferred embodiment of the invention.

FIG. 1 shows a schematic configuration of a robot system according to a preferred embodiment of the invention. Robot system 10 includes a robot 16 having a movable part (or a robot arm in this case) 14 to which a wireless acceleration sensor 12 is attached; and a robot controller 20 connected to robot 16 via a cable 18, etc., and configured to control robot 20. For example, robot 16 is a multi-joint robot having six axes, and is configured to be operated according to a predetermined robot operation program, based on a command from robot controller 20. Wireless acceleration sensor 12 is (preferably, detachably) attached to a front end of arm 14, and is configured to detect acceleration data of a representative point of arm 14 during robot 16 is operated. The acceleration data is transmitted to robot controller 20 by wireless communication as described below. Robot controller 20 carries out learning vibration suppression control for robot 16 based on a time series of acceleration data from wireless acceleration sensor 12.

Figure 2:
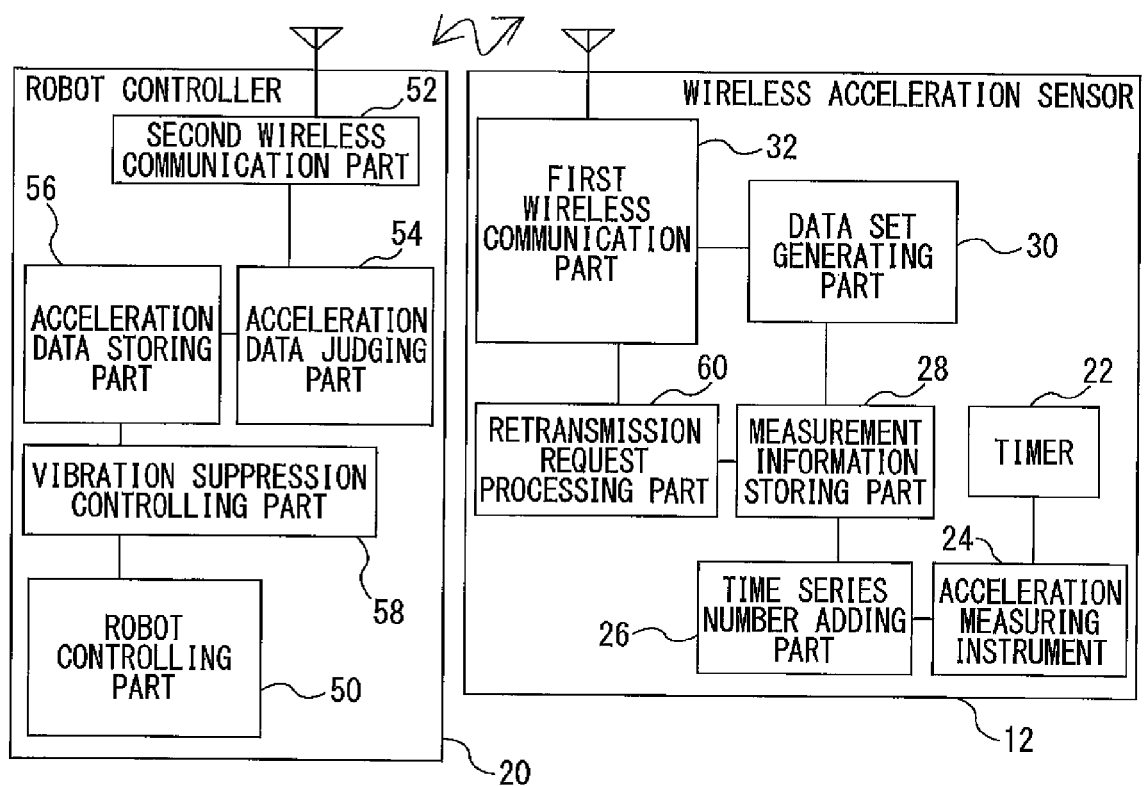
FIG. 2 is a functional block diagram of a robot controller and a wireless acceleration sensor included in the robot system of FIG. 1.

FIG. 2 is a functional block diagram of robot controller 20 and wireless acceleration sensor 12 included in robot system 10. Acceleration sensor 12 has a timer 22 for carrying out periodic measurement; an acceleration measuring instrument 24 which measures an acceleration of arm 14 of robot 16 in each period of time measured by timer 22; an identifying information adding part (or a time series number adding part) 26 which adds identifying information (for example, a time series number as described below) to acceleration data measured by acceleration measuring instrument 24, the identifying information representing time series of the acceleration data; a measurement information storing part 28 which stores the acceleration data to which the identifying information is added; a data set generating part 30 which generates a data set which includes acceleration data in a plurality of periods of time, among the acceleration data stored in measurement information storing part 28; and a first wireless communication part 32 which transmits the data set to robot controller 20 by radio. In addition, as timer 22; measurement information storing part 28; and time series number adding part 26 and data set generating part 30 included in wireless acceleration sensor 12, an internal timer; a memory; and a program included in a conventional microcomputer, may be used.

Hereinafter, a function of each component of acceleration sensor 12 is explained. Acceleration measuring instrument 24 is activated at time intervals (periods) predetermined by timer 22, detects the acceleration of at least one axis (preferably, three axes (X-, Y-, and Z-axes intersecting at right angles to each other) of arm 14, and outputs the acceleration data detected at each period of time.

Time series number adding part 26 adds a number representing time series of the acceleration data (or a time series number) to the acceleration data measured by acceleration measuring instrument 24, wherein the time series number corresponds to the identifying information. The acceleration data, to which the time series number is added, is stored in measurement information storing part 28. As the identifying information, monotonically increasing numbers such as 1, 2, 3, . . . , or characters such as alphabets, capable of representing the time series, may be used. In this regard, the number corresponding to the time series is used to judge which period of data is not correctly obtained when a missing part or a corrupted part is generated in the data received by controller 20. Therefore, when the number reaches a predetermined maximum value after the several wireless communications, the next value of the number may be returned to an initial value such as zero or one and may be incremented from the initial value.

Figure 3:
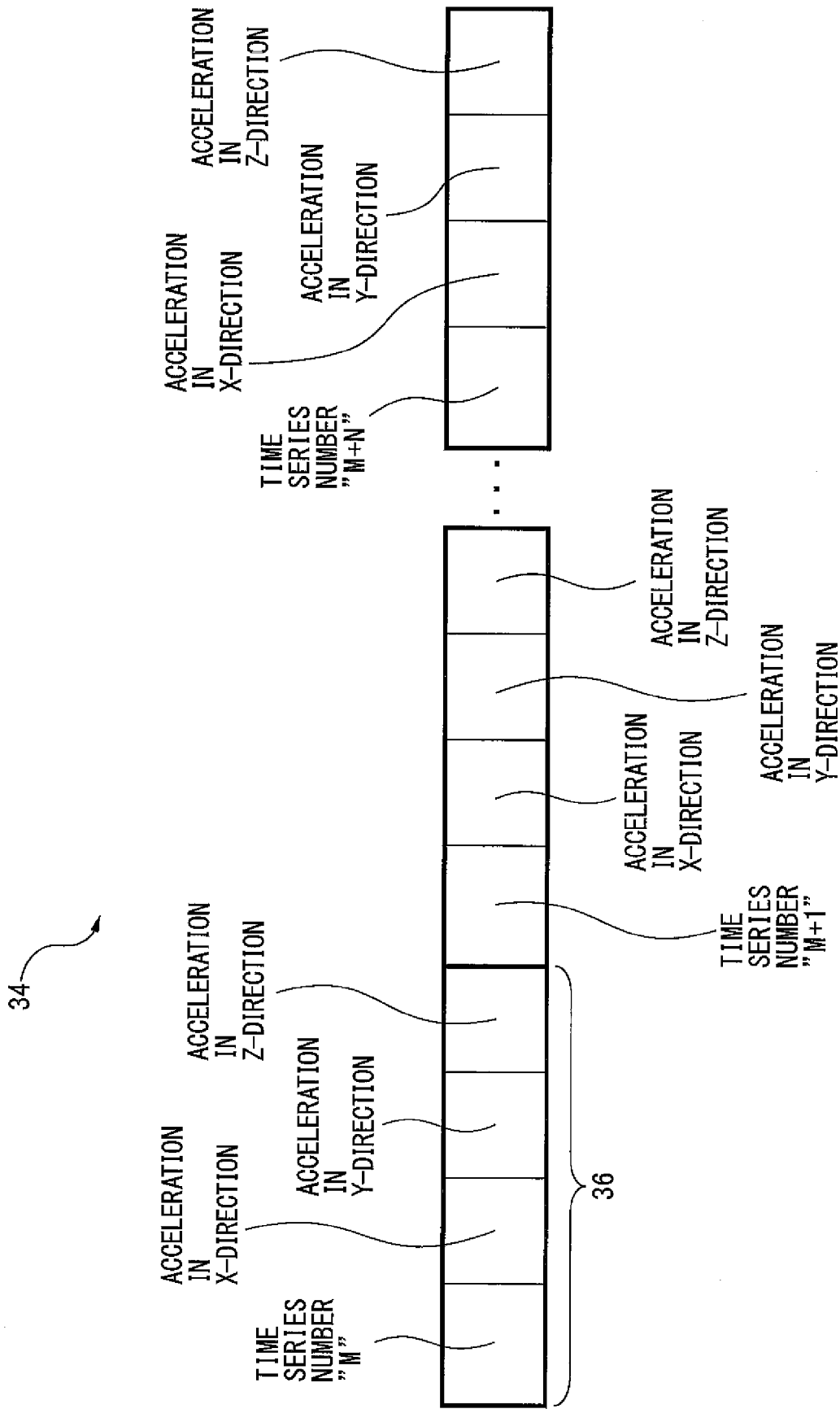
FIG. 3 shows a concrete example of a data set.

Data set generating part 30 confirms that predetermined periods of acceleration data (in examples as exemplified in FIGS. 5 to 8, four periods of acceleration data) is stored in measurement information storing part 28, wherein each period of acceleration data is referred to as one unit. Then, data set generating part 30 generates a data set including the predetermined periods of acceleration data, and outputs the data set to a first wireless communication part 32. FIG. 3 shows a concrete example of the data set, wherein data set 34 includes N-number of periods of acceleration data and each period of acceleration data (one period of sampling data 36) includes a time series number (M, M+1, . . . , M+N) and the acceleration data (in the X-, Y- and Z-directions) corresponding to each time series number. In other words, in the example of FIG. 3, N periods of acceleration data is constituted as a data set which is transmitted from acceleration sensor 12 to root controller 20 by wireless communication one time.

As first wireless communication part 32, a wireless module, which is adapted to a specified low power standard and has a wireless communication protocol, may be used. In detail, the wireless module has a transmission/reception circuit for modulating/demodulating a wireless signal; a control circuit for handling a protocol having a layer lower than an application layer of the communication; and a memory for buffering the transmitted/received data, whereby the wireless module may transmit or receive the data to or from an external microcomputer wired to the wireless module, etc., via a serial communication, etc. In addition, when an ID, etc., of an object wirelessly connected to the wireless module is previously set, only by writing data via the serial communication, additional data such as an address can be automatically added to the data, and then, the data may be packetized and transmitted to a destination, via wireless communication with a wireless module of the destination (in this case, a second wireless module of robot controller 20 as described below).

FIG. 4 shows an example of a format of packetized wireless data 40. Packetized wireless data 40 may include a predetermined preamble 42 and a synchronous word 44 which are transmitted prior to a major part of data; header data 46 having an address, etc., of a destination; a data set, such as data set 34 as described above, having a plurality of periods of acceleration data to which the time series number is added; and footer data 48 such as a cyclic redundancy code (CRC).

As shown in FIG. 2, robot controller 20 has a robot controlling part 50 which operates robot 16 according to a predetermined operation program; a second wireless communication part 52 which carries out wireless communication with first communication part 32 of acceleration sensor 12 and receives the data set, including a plurality of periods of acceleration data (for example, data set 34 of FIG. 3), from wireless acceleration sensor 12; an acceleration data judging part 54 which confirms the identifying information (the time series number) added to the acceleration data contained in the data set, and judges as to whether the time series of the acceleration data is correctly received; an acceleration data storing part 56 which stores the time series of the acceleration data; and a vibration suppression controlling part 58 which carries out vibration suppression control for robot 16 based on the time series of the acceleration data during robot 16 is operated based on the operation program.

Next, a function of each component of robot controller 20 is explained. Second wireless communication part 52 constitutes a wireless module cooperatively with first wireless communication part 32 of acceleration sensor 12, and is configured to receive the acceleration data (or the data set) as a signal transmitted from first wireless communication part 32. Acceleration data judging part 54 confirms that values of the identifying information (or the time series number) of the received acceleration data are arranged in a predetermined order (for example, monotonic increase such as 1, 2, 3, . . . ), and then acceleration data storing part 56 stores the confirmed acceleration data. When there is a deficiency, such as a missing part, in the time series number, it is judged that the acceleration data is not correctly received. Then, robot controller 20 transmits a retransmission request (or a packet in which a number to be retransmitted is written) to acceleration sensor 12 so that acceleration sensor 12 retransmits acceleration data corresponding to the deficiency (see FIG. 6 as described below). Otherwise, when there is a missing part, etc., in the time series number, robot controller 20 may calculate acceleration data corresponding to the missing part based on averaging or polynomial interpolation using acceleration data before and after the missing part.

In this regard, as shown in FIG. 2, acceleration sensor 12 may have a retransmission request processing part 60. When robot controller 20 transmits the retransmission request for the acceleration data, retransmission request processing part 60 extracts acceleration data corresponding to the number requested by robot controller 20 from the data stored in measurement information storing part 28, and outputs the extracted data to first wireless communication part 32. It is necessary that measurement information storing part 28 of acceleration sensor 12 have a capacity capable of storing at least several times acceleration data included in the data set (i.e., transmitted by wireless communication one time). In this regard, it is preferable that measurement information storing part 28 have several times the minimum capacity, since it is necessary that acceleration data transmitted by wireless communication several times be stored in order to properly respond to the retransmission request from robot controller 20.

Vibration suppression controlling part 58 calculates a corrected operation command value for correcting an operation command value of robot 16 so as to suppress vibration of robot 16, based on information including the operation command value of robot 16, an output value of a pulse encoder (not shown) of robot 16, and an output value of acceleration sensor 12. Robot controlling part 50 re-executes the robot operation program using the corrected operation command value. By virtue of the learning vibration suppression control wherein the execution of the robot operation program and the update of the corrected operation command value are repeated, the robot can be controlled while suppressing the vibration thereof.

A time series of the operation command values of the robot and a time series of the output values of the pulse encoder (not shown) of robot 16 may be stored in a memory (not shown) of robot controlling part 50. On the other hand, a time series of the output values of acceleration sensor 12 during the robot operation program is executed may be stored in acceleration data storing part 56 via the first and second wireless communication parts.

In general, if acceleration data is transmitted to a robot controller by wireless communication, when the wireless communication is carried out at each sampling time (or at each period of time), desirable learning control may not be carries out due to increase in data transmission time. On the other hand, in the present invention, the data transmission time may be decreased since a plurality of periods of acceleration data is collectively transmitted while the identifying information representing the time series of the sampled acceleration data is added the data. Further, it can be judged whether the time series of acceleration data is correctly received, by adding the identifying information representing the time series of the sampled acceleration data to the data and confirming the identifying information by means of the robot controller.

Next, with respect to FIG. 3, when there is a limitation of transmission time, etc., in a standard of wireless communication, it is explained how many periods of acceleration data should be included in one data set (i.e., optimum sampling number "N" is explained), with reference to following values. In this regard, a term "L_data" means a bit number of one period of acceleration data (for example, see reference numeral 36 in FIG. 3), and a term "L_head" means a summation of bit numbers of elements in the packet data other than acceleration data (in the example of FIG. 4, a summation of bit numbers of preamble 42, synchronous word 44, header data 46 and footer data 48).

Sampling period of acceleration data: T [s]
Bit number of sampling data in one period (including time series number): L_data
Sampling number included in one data set: N
Additional bit number other than acceleration data by wireless communication one time: L_head
Data transmission rate of wireless communication: W [bps]

By using the above values, following factors regarding the wireless communication can be calculated.

$$\text{Period of wireless communication: } N \times T \text{ [s]}$$

$$\text{Wireless transmission time one time: } (N \times L\_\text{data} + L\_\text{head})/W \text{ [s]}$$

$$\text{Quiescent time of wireless communication: } N \times T - (N \times L\_\text{data} + L\_\text{head})/W \text{ [s]}$$

$$\text{Summation of transmission time per hour: } (N \times L\_\text{data} + L\_\text{head})/(W \times (N \times T)) \times 3600 \text{ [s]}$$

In many cases, there is a limitation in a wireless communication standard. For example, regarding a specified low power radio station, "Standard for 920 MHz-Band Telemeter, Telecontrol and Data Transmission Radio Equipment (ARIB STD-T108)" includes following limitations, wherein an antenna power is 20 [mW] or less, a central frequency is between 922.4 [MHz] and 928.0 [MHz], and a simultaneously used channel is one.

Limitation of transmission time: more than 6 [ms] and not more than 200 [ms]
Quiescent time: 2 [ms] or more
Summation of transmission time per hour: 360 [s] or less As a condition which satisfies the above standard, following setting values may be used, for example.

Sampling period of acceleration data: T=0.01 [s]
Bit number of sampling data in one period (including time series number): L_data=40
Sampling number included in one data set: N=20
Additional bit number other than acceleration data by wireless communication one time: L_head=300
Data transmission rate of wireless communication: W=100,000 [bps]

By using the above setting values, the above factors are calculated as follows.

Period of wireless communication: 0.2 [s]

Wireless transmission time one time: 0.011 [s]

Quiescent time of wireless communication: 0.189 [s]

Summation of transmission time per hour: 198 [s]

In view of the calculation result, the above condition satisfies the limitation in the standard, as described below:
  Regarding the limitation of the transmission time (more than 6 [ms] and not more than 200 [ms]), the transmission time of this case is 0.011 [s](=11 [ms]);
  Regarding the limitation of the quiescent time (2 [ms] or more), the quiescent time of this case is 0.189 [s](=189 [ms]); and
  Regarding the limitation of the summation of transmission time per hour (360 [s] or less), the summation of this case is 198 [s].

As described above, by calculating or selecting appropriate sampling number (N), the wireless communication can be carried out while conforming with a wireless communication standard applied to a usage environment of the robot (i.e., while satisfying the limitations of transmission time, etc.). In this regard, the efficiency of the wireless communication may be improved as the sampling number of the data transmitted one time is increased, whereas a high-capacity memory (or multiple memories) for storing the data is (are) necessary. Further, depending on a specification of a wireless module used as the first and second wireless communication parts, there is an upper limit to an amount of data which can be transmitted by radio one time. Therefore, the sampling number of the data transmitted one time cannot be increased without limitation. In the present invention, an appropriate sampling number may be determined in view of the above.

Another wireless communication may affect as to whether the communication between the first and second wireless communication parts is adapted for a predetermined wireless standard. For example, when a waiting time occurs in wireless communication of the acceleration sensor due to wireless communication in another system, an actual period of time in wireless communication may be different from the above calculated time. As a result, when the summation of transmission time per hour may exceeds a limitation of the standard, data transmission between the first and second wireless communication parts may be automatically stopped, whereby the wireless communication can be carried out while conforming to the standard.

Next, with reference to FIGS. 5 to 8, an example of data transmission/reception by wireless communication in the robot system of the invention is explained. First, as a setup prior to wireless communication, an ID, an address number and a network ID number, etc., are set so that communication between robot controller 20 and wireless acceleration sensor 12 becomes one-to-one communication. In addition, a term "CS" in FIGS. 5 to 8 means "Carrier Sense."

As shown in FIG. 5, after robot controller 20 confirms that a wireless channel is not used by another wireless station, robot controller 20 transmits a signal to acceleration sensor 12, wherein the signal represents that periodic wireless communication of acceleration data is initiated, and starts to execute the robot operation program (a section "A" in FIG. 5). By virtue of this, a commanded position of the robot and a sampling period of time of the acceleration data are synchronized. In this regard, during execution of the robot operation program, an error between a cycle of timer 22 of acceleration sensor 12 and a cycle of an internal timer (not shown) of robot controller 20 is sufficiently smaller than one cycle of the timer.

After a predetermined number of periods of acceleration data measured at each period obtained by timer 22 is stored, acceleration sensor 12, to which the signal representing the initiation of wireless communication is transmitted, outputs a data set including the predetermined number of periods of acceleration data to robot controller by radio (a section "B" in FIG. 5). In the example of FIG. 5, four periods of sampling data of acceleration are collectively transmitted as one data set. In this regard, carrier sense is carried out before the wireless outputting. When it is detected that the channel is used by another wireless station, the data is transmitted after a predetermined random time passes from when the communication by the other wireless station is terminated (a section "C" in FIG. 5).

FIG. 6 shows an example wherein data transmission/reception is not correctly carried out. Even when acceleration sensor 12 periodically carries out wireless communication, the data may not be correctly received by robot controller 20 due to radio wave interference, etc. (a section "D" in FIG. 6). As such, if the data cannot be received, when a retry process is previously prepared in a communication protocol of a wireless module, a retransmission (retry) request is automatically carries out by the communication protocol between the wireless modules. On the other hand, even when such a function is not prepared, acceleration data judging part 54 may confirm the existence of a missing number in the time series number added to the acceleration data, whereby robot controller 20 may carry out the retry request for the missing number (a section "E" in FIG. 6).

On the other hand, in acceleration sensor 12, the acceleration data corresponding to retried numbers (in the illustrated example, time series numbers 13 to 16) is read from measurement information storing part 28, and the data is retransmitted from first wireless communication part 32. In this regard, when newly measured acceleration data is already stored in measurement information storing part 28, a data set including the acceleration data corresponding to the retried numbers and the newly acceleration data (in the illustrated example, acceleration data corresponding to time series numbers 25 to 28) may be transmitted by radio (a section "F" in FIG. 6). By virtue of such a process regarding the retransmission (retry) request, the time series number of the acceleration data may be obtained even when an error occurs in the wireless communication.

FIG. 7 shows data flow before completion of the wireless communication. After the execution of the robot program is completed, robot controller 20 transmits a signal to wireless acceleration sensor 12, wherein the signal represents that periodic wireless communication of acceleration data is completed (a section "G" in FIG. 7). Acceleration sensor 12, to which the signal representing the completion of wireless communication is transmitted, outputs untransmitted (or unsent) acceleration data (in the illustrated example, acceleration data corresponding to time series numbers 105 to 108)

stored in measurement information storing part 28 by radio, if any, and then stops the wireless communication (a section "H" in FIG. 7).

FIG. 8 shows an example wherein the same acceleration data is transmitted from acceleration sensor 12 by radio several times (in the illustrated example, twice). Acceleration sensor 12 outputs acceleration data by wireless communication, and then, after a predetermined quiescent time has passed, outputs again the same acceleration data (in the illustrated example, acceleration data corresponding to time series numbers 201 to 204) (a section "I" in FIG. 8). Acceleration data judging part 54 of acceleration sensor 12 confirms the time series number of the received data, and judges that the same acceleration data is already correctly received when the confirmed time series number is the same as the latest time series number which is received by wireless communication. Then, acceleration data judging part 54 discards one of the duplicated data. In this regard, although the latter data is discarded in the example of FIG. 8, the former data may be discarded. In addition, the same acceleration data may be received three times or more, and in this case, one of the correctly received acceleration data is saved, and the other data is discarded.

On the other hand, when the data may not be correctly received due to radio wave interference, etc., or when the received data is corrupted (a section "J" in FIG. 8), all of the data may be discarded by checking a CRC, etc., added to the acceleration data when transmitting the data by radio. In this case, the same acceleration data (a section "K" in FIG. 8), which is output again by radio, is identified and stored as correct acceleration data. As such, by transmitting the same data by radio several times (preferably, continuously) regardless of whether an error occurs in wireless communication or not, the possibility of missing of the data can be significantly reduced due to an error in wireless communication, without carrying out the retransmission (retry) request as explained with reference to FIG. 6.

In the robot system according to the present invention, by collectively transmitting the plurality of periods of acceleration data, to which the identifying information representing the time series of the sampled acceleration data is added, a desirable learning control can be carried out while reducing data transmission time. Further, by adding the identifying information representing the time series of the sampled acceleration data to the data and by confirming the identifying information by means of the robot controller, it can be judged whether the time series of the acceleration data is correctly received or not. According to the present invention, an advantage of the wireless acceleration sensor (for example, a line or cable is not necessary) can be obtained, while a disadvantage thereof (for example, data corruption due to a communication error) can be redeemed.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A robot system comprising:
   a robot having a movable part to which a wireless acceleration sensor is attached; and
   a robot controller for controlling the robot,
   wherein the wireless acceleration sensor comprises:
      a timer for carrying out periodic measurement;
      an acceleration measuring instrument which measures an acceleration of the movable part of the robot in each period of time measured by the timer;
      an identifying information adding part which adds identifying information to acceleration data measured by the acceleration measuring instrument, the identifying information representing time series of the acceleration data;
      a measurement information storing part which stores the acceleration data to which the identifying information is added;
      a data set generating part which generates a data set which includes acceleration data in a plurality of periods of time, among the acceleration data stored in the measurement information storing part; and
      a first wireless communication part which transmits the data set to the robot controller by radio,
   wherein the robot controller comprises:
      a robot controlling part which operates the robot according to a predetermined operation program;
      a second wireless communication part which carries out wireless communication with the first communication part and receives the data set from the wireless acceleration sensor;
      an acceleration data judging part which confirms the identifying information added to the acceleration data contained in the data set, and judges as to whether the time series of the acceleration data is correctly received; and
      a vibration suppression controlling part which calculates a corrected operation command value for correcting an operation command value of the robot so as to suppress vibration of the robot, based on the operation command value of the robot, an output value of a pulse encoder of the robot, and the time series of the acceleration data during the robot is operated based on the operation program, and
   wherein the robot controlling part re-executes the operation program using the corrected operation command value.

2. The robot system as set forth in claim 1, wherein the data set includes acceleration data in N-number of periods of time, wherein N is an integer equal to or more than two and is previously calculated so as to satisfy a limitation of a time for one wireless outputting operation, a limitation of a quiescent time, and a limitation of a summation of transmission time per hour, which are stipulated in a wireless communication standard applied to a usage environment of the robot system.

3. The robot system as set forth in claim 1, wherein the robot controller confirms the identifying information added to acceleration data received from the acceleration sensor, and then, when there is a missing part in the identifying information, the robot controller transmits a retransmission request to the acceleration sensor so that the acceleration sensor retransmits acceleration data corresponding to the missing part, or calculates acceleration data corresponding to the missing part based on interpolation using acceleration data before and after the missing part.

4. The robot system as set forth in claim 1, wherein the acceleration sensor transmits the same acceleration by radio several times, and then, when the identifying information added to acceleration data received from the acceleration sensor is identical to the identifying information added to previously received acceleration data, the robot controller discards acceleration data including the same identifying information except for one of the acceleration data including the same identifying information.

5. The robot system as set forth in claim 1, wherein the robot controller repeats the execution of the robot operation program and the update of the corrected operation command value.

6. The robot system as set forth in claim 1, wherein, after the robot controller confirming that a wireless channel is not used by another wireless station, the robot controller transmits a signal, representing that periodic wireless communication of acceleration data is initiated, to the acceleration sensor, and the robot controller starts to execute the robot operation program.

* * * * *